Patented Mar. 22, 1949

2,464,931

UNITED STATES PATENT OFFICE 2,464,931

PURIFICATION OF NAPHTHENIC HYDROCARBONS

Alfred E. Hirschler, Drexel Hill, Pa., assignor to Sun Oil Company, Philadelphia, Pa., a corporation of New Jersey No Drawing. Application January 26, 1946, Serial No. 643,764

2 Claims. (Cl. 260—666)

This invention relates to the separation of hydrocarbons and is particularly directed to a method of preparing a naphthene hydrocarbon of high purity from a mixture comprising a large amount of the same and a small amount of one or more paraffin hydrocarbons.

In the preparation of individual hydrocarbons by organic synthesis, it is seldom that the desired hydrocarbon may be produced directly in a high state of purity. Generally a mixture of hydrocarbons is formed, which includes compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segregate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing closely related hydrocarbons. Usually the best that has been done from a practical aspect is to prepare hydrocarbons of technical purity, such as in concentrations in the order of 80% to 95%. To produce hydrocarbons in a high state of purity, for example in concentrations better than 95%, from mixtures containing close boiling compounds heretofore has been extremely difficult and, in many cases, practically impossible.

The present invention provides an improved method whereby relatively pure hydrocarbons of the naphthenic class may be prepared from a starting material comprising a large proportion of the desired naphthene and a small proportion of one or more paraffin hydrocarbons. The method is particularly useful where the components in the starting mixture boil closely together. The purification is accomplished according to the invention by selective adsorption of the paraffin from the naphthene, utilizing as the adsorbent silica gel or any similar adsorbent which conforms substantially to silica gel in adsorptive properties.

It is well known that hydrocarbons may be separated to an extent according to chemical type by selective adsorption on silica gel or like adsorbents. This procedure has been utilized to separate aromatics and olefins from saturated hydrocarbons (i. e. naphthenes and paraffins). Among the saturated hydrocarbons, it has heretofore been thought that the naphthenes are more adsorbable than the paraffins although not greatly so. However, it has not been considered possible that a paraffin hydrocarbon may be selectively adsorbed from a naphthene, especially when there is no great difference in their molecular weights.

I have now found that a great many mixtures of naphthene and paraffin hydrocarbons behave in an unexpected manner in that, under certain conditions, the paraffin is more adsorbable than the naphthene. While this is seldom so when a large proportion of the paraffin is present, it is often the case when the mixture contains a predominant amount of the naphthene and only a minor amount of the paraffin. With mixtures of this type, there is a certain definite proportion at which the paraffin and the naphthene have the same adsorbability. By starting with such a mixture which contains the paraffin in a proportion less than said certain definite proportion, the paraffin may be selectively adsorbed therefrom and the naphthene may be obtained in a relatively high state of purity. Further, I have found that with mixtures that behave in this manner the smaller the amount of the paraffin the more easily its removal may be effected, which is in contrast to other separation methods such as distillation or solvent extraction wherein the separation becomes more difficult as the amount of a component decreases.

It is not always the case that the paraffin when present in small amount will be selectively adsorbed from the naphthene. In certain cases the naphthene will be the more adsorbable component throughout substantially the whole concentration range; although this type of behavior appears to be generally the exception particularly if the components do not differ greatly in molecular weight, as when there is a difference of not more than three carbon atoms per molecule. However, in order that the present invention will be applicable in a particular case, it is necessary to start with a mixture from which the small amount of paraffin is selectively adsorable. It has not been possible thus far to predict with certainty that this will be the case for any given combination of a naphthene and a paraffin and it has been necessary to predetermine that the paraffin actually will be selectively removable when present in small proportion.

In practicing the invention, a charge material is selected which contains a large amount of the desired naphthene together with a relatively small amount of paraffin as impurity and from which the paraffin is selectively adsorbable, and this material is treated with silica gel or a like adsorbent to selectively adsorb the paraffinic component. In order to effect a high degree of separation, this treatment is carried out preferably by percolating the charge through a column of the adsorbent while employing a large proportion of the adsorbent. After all of the charge has passed into the adsorbent, it may be followed by a desorbing agent such as a polar organic liquid (e. g. alcohol or acetone) or water to displace the adsorbate, although this is not requisite if sufficient charge is used to wet all of the adsorbent and produce a filtrate. The first portion of efflux or filtrate from the column will comprise the naphthene in a relatively high state of purity as compared to the charge. Succeeding portions will decrease in purity and, as the adsorbate is displaced from the gel, the filtrate will become less pure than the charge. The filtrate from the column may be cut into fractions as desired in order to segregate the portion containing the naphthene in the purity desired.

A few examples of paraffin-naphthene starting mixtures to which this manner of purification is applicable are as follows: n-heptane-methylcyclohexane; n-hexane-cyclohexane; pentadecane-dicyclohexyl; n-octane-ethylcyclohexane; neohexane-cyclohexane; 2,4-dimethylpentane-cyclohexane; and triptane-cyclohexane. With any of these as well as with many other such combinations, the paraffinic component if present in small amount (for example, 20% or less) may be preferentially adsorbed and the naphthene thus obtained in a high state of purity.

Examples of the exceptional type of mixture in which the naphthene is preferentially adsorbed over substantially the whole concentration range, so that the present method cannot be used to selectively adsorb the paraffin, are neohexane-cyclopentane and 2,2,4-trimethylpentane-ethylcyclohexane. A mixture of 2,2,4-trimethylpentane-methylcyclohexane exhibits an intermediate type of behavior wherein the paraffinic component must be present in smaller proportion than usual before it is selectively removed.

The following examples, in which percentages are by volume, will serve to illustrate more specifically how the invention may be practiced:

Example I

A column having an internal diameter of about ½ inch and a height of 3 feet was packed with 84 grams of 28–200 mesh silica gel. The column was provided with a water jacket through which ice water was circulated to adsorb the heat generated due to wetting of the gel and to maintain the temperature substantially constant within a few degrees of ice temperature. Twenty-four milliliters of a mixture composed of 90% cyclohexane and 10% n-hexane were filtered into the gel and this was followed by alcohol to force the hydrocarbon material through the gel and thereby obtain a filtrate. The first portion of filtrate amounting to about 42% of the charge was found to be 99.5% pure cyclohexane, while the first 62% was found to have an average purity of 98.5%.

Example II

Fifty milliliters of a mixture containing 89.5% dicyclohexyl and 10.5% pentadecane were percolated through 84 grams of silica gel as in Example I. The first portion of filtrate representing 20% of the charge contained 95% dicyclohexyl. It was found that 80% of the total hydrocarbon charge had a purity with respect to dicyclohexyl exceeding that of the charge.

Example III

In another run carried out as in the previous example using the same amounts of charge and silica gel, it was found that a mixture containing 90% ethylcyclohexane and 10% n-octane yielded a first filtrate cut, amounting to 10% of the charge, which was 99.5% pure ethylcyclohexane.

Example IV

In another run in which 50 ml. of cyclohexane containing 10% 2,2-dimethylbutane were treated with 80 grams of silica gel, the first 10% cut of the filtrate was found to contain 93.5% cyclohexane. A higher purity could have been obtained by taking a smaller first cut or by retreating the first cut with regenerated gel.

Example V

Fifty milliliters of a mixture comprising 90% methylcyclohexane and 10% 2,2,4-trimethylpentane were treated with 84 grams of silica gel as in the preceding examples and a first 10% filtrate cut was obtained containing 92% methylcyclohexane. A higher purity likewise could be obtained in this example either by taking a smaller first cut or by retreating the first cut with regenerated gel.

Example VI

The starting material was a mixture composed of 90% cyclohexane and 10% 2,4-dimethylpentane. Fifty milliliters of this material were treated with 84 grams of silica gel as in the previous examples and a 30% cut was obtained in which the cyclohexane content was 96.5%.

Example VII

In another run in which fifty milliliters of cyclohexane containing 10% 2,2,3-trimethylbutane were treated with 84 grams of silica gel, the first 10% cut of the filtrate was 96% pure cyclohexane.

Example VIII

In the present example no alcohol was employed for forcing the hydrocarbon through the gel, but, instead, a larger volume of charge was used. One hundred milliliters of a mixture comprising 90% methylcyclohexane and 10% n-heptane were filtered through 84 grams of the 28–200 mesh silica gel. The first 8% of the filtrate was substantially pure methylcyclohexane.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

It is contemplated that adsorbents other than silica gel may be used in practicing the invention provided that they conform substantially to silica gel in adsorptive properties and similarly have a high activity; for example, a sufficiently highly activated alumina might be used. Other modifications of the process are permissible within the broad aspects of the invention and will be apparent to those skilled in the art.

Having described my invention, what I claim and desire to protect by Letters Patent is:

1. A process for purifying a naphthene hydrocarbon which contains in admixture therewith as impurity less than 20% of a paraffin hydrocarbon which differs from the naphthene hydrocarbon by not more than three carbon atoms per molecule, said hydrocarbons having the same adsorbability when admixed in a certain definite proportion, which comprises introducing said naphthene hydrocarbon containing such paraffin hydrocarbon in a proportion substantially less than said certain defintie proportion into a body of silica gel, thereby selectively adsorbing the paraffin, and separating from the silica gel a filtrate fraction which contains only a portion of the total hydrocarbons introduced, thereby obtaining the naphthene in more nearly pure state.

2. A process according to claim 1 wherein the said hydrocarbons contain the same number of carbon atoms per molecule.

ALFRED E. HIRSCHLER.

REFERENCES CITED

The following references are of record in the file of this patent:

UNITED STATES PATENTS

| Number | Name | Date |
|---|---|---|
| 2,306,610 | Barrer | Dec. 29, 1942 |

OTHER REFERENCES

Mair et al., Oil and Gas J., Sept. 19, 1935, pages 29 30 and 32.